Patented Nov. 14, 1939

2,179,917

UNITED STATES PATENT OFFICE 2,179,917

MEDICINAL SUPPLEMENT AND METHOD OF MAKING

Henry Brinton, Coatesville, Pa.

No Drawing. Application February 3, 1936, Serial No. 62,169

22 Claims. (Cl. 167—81)

My invention relates to a medicinal supplement, to a food ration, particularly desirable for use in a poultry ration but intended for use with any food ration to which it may be suited, and to its method of production.

The present application is a continuation in part of my application Serial No. 655,082, filed February 3, 1933, for Medicinal supplement to a food ration.

A purpose of my invention is to produce a vitamin-containing feeding oil, preferably a fish oil containing a vitamin of artificially enhanced iodine content by iodizing the oil, interrupting or arresting the reaction before a critical point is reached at which the reaction undesirably affects the properties of the oil, and particularly before it has destroyed or seriously impaired the vitamin content. I disperse in the presence of a suitable dispersing agent such as dried milk or casein.

A further purpose is to disperse in water, milk or other suspension medium, a reaction mixture of iodine and a vitamin-containing feeding oil early enough in the iodizing operation for the fact of dispersion to prevent destructive action upon the vitamin content. I feed this organic-iodine-containing oil to birds and animals including human beings.

A further purpose is to prevent the formation of starch iodide in an artificially iodized vitamin-containing food by combining the iodine organically in a combination which does not freely react with the starch in the starchy portions of the ration.

Further purposes appear in the specification and in the claims.

Iodine has been shown to produce a stimulating effect on the health of poultry, to increase the fertility and hatchability of eggs and the livability of chicks, to counteract the effect of poisons given off by intestinal parasites and coccidiosis. It tends to prevent birds having coccidiosis from contracting paralysis. Poultry have a relatively high demand for iodine.

Attempts have been made to feed colloidal iodine in a medium such as water, but this has not been entirely successful because the colloidal iodine is relatively expensive, the dosage must be carefully regulated since the colloidal iodine is very concentrated, there is need for thorough mixing with the ration to gain uniform distribution, colloidal iodine is not readily assimilated and a good deal passes through the system without assimilation. Colloidal iodine is especially corrosive to many materials and forms starch iodide when mixed with the cereal portions of the ration.

I have succeeded in combining iodine with vitamin-containing oils, for example fish food oils like cod liver oil without destroying or seriously impairing the vitamin content, and feeding the artificially iodized vitamin-containing oil to poultry and other animals. This has the decided advantage that the vitamins, particularly vitamins D and A, which assist in assimilation and calcification, are accompanied by the iodine, which serves as a useful oxidizing agent, and that the proportions of vitamins and iodine absorbed are maintained without danger that the birds or other animals might take more iodine than vitamin-containing material. The iodine is desirably present in a noncorrosive form, the iodine, being present in a feed. The iodine is readily assimilated at high efficiency, and the product is not unpleasant to the chickens or other animals.

To produce my vitamin-containing artificially iodized feeding oil, special precautions must be taken in the treatment and handling of the oil, as otherwise the oil is seriously discolored, its vitamin content greatly impaired or destroyed, the palatability of the oil to the chickens or other animals is markedly decreased, and the keeping qualities of the oil impaired.

It will be understood of course that the concentrations of iodine built up in the oil are substantial, but that they by no means represent complete saturation of the unsaturated portions of the molecules of fatty acids in the oil. Expressed more specifically, the oil after the completion of the iodization by my process will still have an iodine number in the normal case, although the iodine number will be lowered. In tests on poultry, I have found that a desirable product may be produced using 30 grams of iodine to a quart of oil. Other experiments indicate that 15 grams of iodine to a quart of oil is a satisfactory proportion. Smaller quantities of iodine may be used, but are not regarded by me as being nearly so desirable for poultry work. Larger quantities of iodine than 30 grams per quart may be used.

Where a suitable quantity of iodine, for example crystals of elemental iodine, are added to a vitamin-containing feeding oil, such as cod liver oil, there is initially a slight change in color, indicating a reaction of the iodine in the oil to saturate some unsaturated portions of the oil molecules. For a short period this is all that appears to happen.

After a critical time has passed, the oil radically changes its character, becoming much darker and usually very black or dark green. This black product has different properties from those exhibited by the oil as first iodized. The black or dark oil is sticky, foul-smelling and becomes rancid very quickly. Even before it becomes rancid it is so unpalatable that it has been found difficult on tests to make poultry eat it at all, and it is undigestible when eaten. The discolored oil does not readily emulsify.

Much more important, however, feeding tests indicate that the discolored oil is of very inferior vitamin content, in fact, judging by the feeding tests, the discolored oil has no observable vitamin content, although there may of course be a small vitamin content which would not show up by tests.

I have discovered that the iodized oil which is first obtained may be preserved if precautions are taken to prevent discoloration and other changes in properties. To preserve the oil in the form in which it is initially obtained immediately after the reaction between the iodine and the vitamin-containing oil, I bring about a dispersion before the end of the critical time. The dispersed product differs markedly in properties from the discolored oil. It maintains its color unchanged over a long period of time. It is palatable to the poultry and presents no feeding difficulty. It readily mixes with liquid or solid portions of the diet.

Most important of all, the dispersed product of the initial reaction between iodine and vitamin-containing feeding oil has its vitamin-content substantially unchanged or, at least, not seriously impaired, as shown by feeding tests. The vitamin A effects are rather increased provided the unsaturated linkages are not very greatly reduced. It will of course be understood that in the present state of knowledge, it is not possible to determine whether there may be a slight impairment of the vitamin content, but it is clear from the feeding tests that the dispersed oil has a vitamin content apparently the same as and of the same order of magnitude as the original uniodized oil (except that the vitamin A effect may be increased), whereas the discolored oil appears to have no observable vitamin content.

In producing the vitamin-containing artificially iodized food oil, I first mix together the iodine and oil. I find that much more satisfactory results are obtained if the iodine crystals are finely ground before they are mixed with oil. The quantity of iodine and of oil should of course be measured to give the desired iodine content. The mixing may be accomplished mechanically or by hand and as a continuous or a batch process.

In carrying out the process by hand I find that it is preferable vigorously to mix together relatively small quantities of iodine and oil at a time, starting say with a pint of oil or even a smaller quantity and mixing iodine preferably in a glass or porcelain vessel with the correctly measured quantity of oil.

In order to avoid discoloration of the oil and impairment of its vitamin content, I first mix the oil and iodine and complete its dispersion before the critical time has elapsed. The dispersion prevents the secondary reaction or other action which would otherwise discolor the oil and impair its vitamin content and preserves the artificially iodized oil originally obtained.

To accomplish the dispersion I preferably add a dispersing agent and a dispersion medium. The dispersing agent may be casein, dried milk (which contains casein), gum arabic or other suitable dispersing agent. The dispersion medium is of course a liquid such as water, liquid milk, liquid mash or other suitable liquid. To accomplish the stirring, the dispersing agent and dispersion medium are added, and the mixture vigorously stirred.

If too little water, liquid milk, etc., is added, the mixture may form an oily paste which is difficult to emulsify.

It will be understood that the bulk of the vitamin-containing artificially iodized food oil need not be greatly increased by the dispersion, as a relatively small quantity of dispersion medium may be used to produce a relatively concentrated dispersion. Excellent results may be secured using a quantity of dispersion medium about equal to the quantity of oil. It is desirable to make such a concentrated mix because of the small volume for storage and shipment, diluting later; but a more dilute mix can be made initially if preferred.

The concentrated dispersion may be preserved in cans, tanks or other vessels for an extended period without becoming rancid, losing or suffering great impairment in its vitamin potency or ceasing to be palatable to poultry and other animals. During storage the dispersion is preferably kept in airtight containers, and can be shipped in them without special precautions.

The relatively concentrated dispersion may be diluted at or before the time of use by adding more dispersion medium. Thus the oil may be iodized and the dispersion agent and a little dispersing medium added at the time and place of manufacture, while more dispersion medium may be added at the time and place of use.

There is some doubt as to exactly what takes place in the reaction. It is very clear that delay in dispersion results in a poor product as indicated. It is not so clear as to exactly why this is true. The iodine supplied is insufficient for complete iodization of the oil in the sense that not all of the double bonds are saturated and the resultant product still has an iodine number. However, it is not clear whether the iodine which has been supplied has incompletely combined with oil and the further combination with oil results objectionably if the operation be not arrested at the early point, or whether a further reaction such as, for example, an oxidizing reaction takes place if the dispersion be delayed, or whether there be a combination of these two. Whatever the fact as to this, the product is greatly improved by dispersing at an early point of time after the iodizing process begins.

The determination of the critical time before which the dispersion must be completed is a relatively simple matter. The iodized oil should be dispersed while it is still yellowish to reddish brown and not black. The time which may elapse, before dispersion is necessary to prevent vitamin impairment, appears to depend upon the temperature of the oil and the quantity of iodine which is being added to the oil. Where the oil is cod liver oil at room temperature and the quantity of iodine added is from fifteen to thirty grams per quart of oil, I have had success by completing the dispersion within approximately five minutes from the time that the reaction between the iodine and the oil began. Under these conditions, therefore, the critical time is appropriately five minutes, but the critical time may be shorter if the iodine concentration be higher or if the temperature be elevated. Correspondingly, cooling of the ingredients would serve to increase the critical time.

In general it is my recommendation that the dispersion be made as quickly as possible, provided sufficient time is allowed to elapse for a reasonable amount of combination between the iodine and the oil. It is not seriously objectionable if a quantity of uncombined iodine remains in the reaction vessel, providing allowance is made for this quantity in determining the amount of iodine added to the oil.

It will of course be understood that reaction between the uncombined iodine and oil is very slow or negligible after dispersion has taken place, but that it is preferable to separate the uncombined iodine from the dispersion.

The critical time varies with the oils. For example, salmon oil is relatively more difficult to iodize than cod liver oil, and the critical time is longer at any given temperature, although the iodization of salmon oil is usually accelerated by increasing the temperature to a point at which it behaves more nearly like cod liver oil.

I much prefer dried milk as a dispersing agent because it has a recognized food value and because it will not produce any undesirable effects by reaction with free iodine which may still be present at the time that the dispersing agent is introduced. Flour and starch may be used as dispersing agents, preferably after treating with boiling water, but there is danger of formation of starch iodide unless free iodine has substantially disappeared by the time the flour or starch is introduced.

Cod liver oil is desirably high in biliary compounds and in vitamins A and D.

Excellent results may be secured using as a starting material, cod liver oil which meets the following specifications:

Vitamin A, 8 or more Lovibond blue color units.
Vitamin D, at least 60 rat units of anti-rachitic activity per gram.
Free fatty acid (as oleic acid) not over 1.5%.
Unsaponifiable matter, not over 1.5%.
Iodine number, 155 to 178.
Specific gravity, 0.92 to 0.93.
Saponification number, 179 to 192.
Refractive index at 40°, 1.4704 to 1.4745.
Taste, fishlike but not bitter.
Odor, slight, fishlike but not rancid.

Other fish food oils than cod liver oil may be used, such as menhaden oil, herring oil, blubber oil, sperm oil, burbot oil, high seal oil, sardine oil, salmon oil, cod oil, coalfish oil, shark liver oil, pilchard oil, halibut liver oil (which is particularly desirable because of its high vitamin A and D content and its palatability), or fish meal, dried cod liver oil, or cod liver meal (which contain some oil).

One of the preferable forms of my invention consists of cod liver oil, iodine, dried milk in flake or powdered form as a dispersing agent and water as a dispersion medium. This product is very stable, and does not quickly become rancid. It is not corrosive to vessels in which it may be kept. It is very palatable to poultry and other animals. The efficiency of absorption of iodine is high due to the fact that it is present in a fatty compound which is digested by the body. The vitamin potency is high if the composition is prepared in accordance with my invention, with particular reference to vitamin A effects.

The iodine-enriched vitamin-containing fish food oil is a valuable composition for fattening chickens or ducks.

The assimilation of mineral salts is also assisted by the iodized vitamin-containing fish food oil. This is very important in the case of high production laying hens.

I obtain a very high efficiency of iodine absorption by the body of the chicken and in the eggs produced by it due to the fact that the iodine is present in an organic compound which is normally digested by the chicken, and, when digestion takes place, the iodine-containing oil is broken down and iodine is absorbed by the body of the chicken; this is not true with free iodine or with an inorganic iodine compound.

The feeding of iodized vitamin-containing oil with milk is particularly desirable in the case of poultry. Iodine aids absorption of minerals by the chicken (so necessary for egg laying) and vitamin D acts similarly. Dried milk is relatively rich in minerals. Therefore the iodine and vitamin D from the fish food oil are present while the milk is digesting to aid in assimilation of minerals.

Eggs produced are superior because of high iodine content in the eggs, because of the improved normal structure and food value of the eggs, and because the membranes surrounding the yolks are toughened and are more resilient. The eggs have superior keeping qualities.

The increased iodine in the ration builds up resistance to numerous infections prevalent among chickens, and likely to be fatal among young chickens, such as bacillary white diarrhea, coccidiosis, pneumonia, colds, roup, etc. My iodized ration speeds feathering, supplies vitamins A and D and assists the young chick in building up its body resistance against intestinal parasites and worms.

If desired, the vitamin content of the oil may be increased by viosterol or any other suitable concentrated vitamin-containing substance.

While I have widely tested my iodized ration on poultry, I also have applied it to animals, and even to human beings with success.

I use the term "food" oil to designate an oil capable of being eaten and digested, as distinguished from an oil like mineral oil or castor oil which is not digestible.

The dispersion will ordinarily be an emulsion, stable for weeks, but will be effective to the extent of preventing destruction of vitamins and preventing other desirable changes in the property of the product even when not stable. It may be mixed with absorbent material such as bone meal, charcoal, corn meal or even sawdust. The water medium is colloidally associated with the particles of oil.

The quantity of iodine, preferably of the order of 1%, 2% or 3% of the weight should preferably not rise beyond 4% for ordinary purposes because the extent of unsaturation of the fatty acids in the oil will then be excessively reduced. I prefer a total daily iodine feed of about 4 milligrams of iodine per chicken per day although much greater doses over extended periods produce no noticeable ill effect.

Calcium absorption is aided by vitamin-bearing fatty acids or their glycerides which have a high iodine content and a high extent of unsaturation. Desirably the oil is partially unsaturated when iodization is finished. As the percentage of iodine to the weight of oil is increased, the vigilance required to prevent destruction of the vitamins increases, and above 4% of iodine more care is demanded.

In view of my invention and disclosure variations and modifications to meet individual whim or particular need will doubtless become evident to others skilled in the art, to obtain all or part of the benefits of my invention without copying the process and composition described, and I, therefore, claim all such in so far as they fall within the reasonable spirit and scope of my invention.

Having thus described my invention, what I claim as new and desire to secure by Letters Patent is:

1. In the art of producing a vitamin-containing fish oil of artificially increased iodine content, the process which consists in adding iodine to the oil and in dispersing the oil in an aqueous dispersion medium in the presence of a dispersing agent at a stage of the iodization before the oil is fully saturated and before the oil becomes dark.

2. The process of producing a vitamin-containing fish food oil of artificially increased iodine content, which consists in iodizing the oil by reaction with elemental iodine to an extent insufficient to produce saturation and in dispersing the oil in an aqueous dispersion medium in the presence of a dispersing agent at a stage in the reaction before the oil becomes dark.

3. The process of producing a vitamin-potent fish food oil of artificially increased iodine content which consists in iodizing the oil to an extent insufficient to produce saturation, in adding a dispersing agent and a dispersion medium to the oil and in dispersing the iodized oil in the dispersion medium before the oil becomes dark.

4. The process of producing a vitamin-containing fish food oil of artificially increased iodine content which consists in mixing together a vitamin-containing oil and elemental iodine in quantity insufficient to completely saturate the fatty acid of the oil and in dispersing the iodized oil in a dispersion medium by mixing in the presence of a dispersing agent at a stage in the chemical change of the iodized oil prior to the point at which the iodized oil would otherwise become dark in color, poor in keeping qualities, of decreased vitamin potency and unpalatable to poultry.

5. The process of producing artificial iodized cod liver oil of vitamin potency which consists in iodizing the oil, keeping the iodine content of the oil below 4% and in dispersing the iodized oil in a dispersion medium in the presence of a dispersing agent before the end of an elapsed time of approximately five minutes from the beginning of the iodization.

6. The process of producing a medicinal addition to a poultry ration which consists in treating a vitamin-containing fish food oil having unsaturated glycerides with iodine to form a chemical compound of the food oil and iodine containing less than 4% of iodine and in dispersing the iodized oil in a dispersion medium in the presence of a dispersing agent prior to the time at which the food oil would otherwise become dark and be of markedly decreased vitamin potency.

7. The method of producing a medicinal addition to a poultry ration, which consists in treating cod liver oil with iodine to form a chemical compound of the cod liver oil and iodine still containing unsaturation and in dispersing the chemical compound in a watery medium and in the presence of a dispersing agent at a time prior to the time at which the iodized cod liver oil would become dark and be of markedly decreased vitamin potency.

8. The process of producing a medicinal addition to a poultry ration which consists in treating a vitamin-containing fish food oil with iodine to form a chemical compound of the food oil and iodine-containing-unsaturated-fatty compounds not saturated by the iodine and in immediately dispersing the chemical compound in a watery dispersion medium in the presence of dried milk.

9. A fish food oil in dispersion form which has artificially added iodine chemically combined with the oil, which nevertheless has its vitamin potency substantially unimpaired and which contains unsaturated fatty compounds, a dispersing agent and a dispersion medium.

10. A fish food oil in dispersion form containing an artificial chemical compound of iodine and the oil having less than enough iodine to saturate all of the fatty compounds in the oil, having its vitamin content substantially that of the oil prior to formation of the chemical compound, and having the properties of light color, palatability of taste to poultry and high keeping qualities, a dispersing agent and a dispersion medium.

11. A dispersion containing a watery dispersion medium, a dispersing agent and a fish food oil having artificially added iodine chemically combined with the oil and having vitamin potency, dispersed in the dispersion medium, the oil containing less than enough iodine to saturate all unsaturated compounds.

12. A dispersion containing a watery dispersion medium, a dispersing agent and a fish food oil having artificially added iodine chemically combined with the oil, incompletely saturated and having vitamin potency, dispersed in the dispersion medium in the presence of the dispersing agent, the oil being light in color.

13. A dispersion containing a water dispersion medium, dried milk and cod liver oil having artificially added iodine chemically combined with the oil, incompletely saturated and having vitamin potency.

14. A medicinal supplement to a poultry ration containing fish food oil having artificially added iodine chemically combined with the oil in dispersion form, incompletely saturated and having substantially unimpaired vitamin potency, a dispersing agent and a dispersion medium.

15. A medicinal supplement to a poultry ration containing cod liver oil in dispersion form having artificially added iodine chemically combined with the oil, incompletely saturated and having vitamins active after the iodization, a dispersing agent and a dispersion medium.

16. A medicinal supplement to a poultry ration consisting of a dispersion of a fish food oil having artificially added iodine chemically combined with the oil, incompletely saturated and having vitamin potency, in a watery medium in the presence of a dispersing agent.

17. A medicinal supplement to a ration consisting of a liquid fish food oil containing more than one per cent of iodine chemically combined with the oil and less than enough iodine to saturate the oil and having substantial vitamin potency in combination with a substance for maintaining the oil in a stable dispersion over an extended period of time.

18. A medicinal supplement to a ration consisting of a liquid fish food oil containing more than one per cent of iodine chemically combined with the oil and less than enough iodine to saturate the oil and having substantial vitamin potency, in combination with dried milk and a watery dispersion medium.

19. A poultry fish food oil containing less than 4% of artificially added iodine chemically combined with the oil and having a substantial vitamin content, protected against destruction by a dispersing agent and dispersion medium.

20. A medicinal supplement to a poultry ration in the form of a dispersion consisting of cod liver oil containing more than one per cent of artificially added iodine chemically combined with the oil and less than enough iodine to saturate the oil and having a substantial vitamin potency, a dispersing medium and a substance for maintaining the cod liver oil in dispersion.

21. A medicinal supplement to a ration consisting of sardine oil having added iodine chemically combined with the oil, incompletely saturated and having vitamin content, a dispersing agent and a dispersion medium.

22. A food ration including a dispersion of the reaction product between burbot oil and iodine, less than enough to saturate the oil and containing vitamins A and D undestroyed, in a dispersion medium and in the presence of a dispersing agent.

HENRY BRINTON.